United States Patent Office 3,054,773
Patented Sept. 18, 1962

3,054,773
POLY(DIPHENYL ETHER-p-XYLYLENES) AS VISCOSITY INDEX IMPROVING AGENTS
Donovan R. Wilgus, Richmond, Calif., assignor, by mesne assignments, to the United States of America as represented by the United States Atomic Energy Commission
No Drawing. Filed Nov. 12, 1958, Ser. No. 773,149
4 Claims. (Cl. 260—61)

This invention relates to new compositions of matter having improved viscosity index characteristics; in particular, this invention is directed to new compositions of matter which are effective to improve the viscosity-temperature characteristics, that is, the viscosity index (V.I.), of lubricating oil compositions.

The greater proportion of oils obtainable by refining processes and useful as base oils for lubricating oil compositions have wide variations in viscosity characteristics with changes in temperature. They do not have agents specifically incorporated therein for the purpose of imparting reduced changes in viscosity with changes in temperature. That is, at a particular temperature, a lubricating oil may be quite viscous, while at higher temperatures the lubricating oil may have a viscosity of a fluid such as kerosene. In order that the viscosity of a lubricating oil composition will not change rapidly with changes in the temperature of an internal combustion engine, for example, numerous additives have been designed to modify the viscosity-temperature characteristics of lubricating oils. The changes in the viscosity occurring with variations in temperature are kept at a minimum.

Polymeric additives in general are used to improve the viscosity-index characteristics of lubricating oil compositions. Such polymeric additives include, for example, alkyl methacrylate polymers (e.g., polybutyl methacrylate), and polyolefins (e.g., polybutenes). These additives are known to improve the viscosity-temperature relationships of lubricating oils.

The art is replete with numerous viscosity index improving agents. However, the known viscosity index improving agents (e.g., polyalkylmethacrylates) decompose at high temperatures.

Thus, it is a primary object of this invention to set forth new compositions of matter which are thermally stable and which improve the viscosity-temperature characteristics of lubricating oil compositions; that is, new compositions of matter which increase the viscosity index of lubricating oil compositions, including lubricating oil compositions used in an atmosphere of nuclear radiation.

In accordance with this invention, it has been discovered that diphenylether-p-xylylene copolymers i.e., poly-(diphenylether-p-xylylenes) are new compositions of matter useful as viscosity index improving agents.

The poly(diphenylether-p-xylylenes) of this invention are described by the formula:

(I) 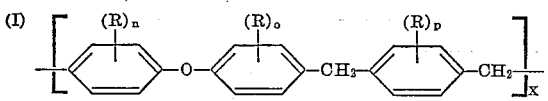

wherein R represents branched or straight-chain hydrocarbon radicals containing from 2 to 20 carbon atoms; n, o, and p are numbers from 0 to 3; and X is a number representing the number of monomeric units in the polymer.

It is preferred that R is an alkyl radical containing from 2 to 20 carbon atoms. Examples of R radicals include methyl, ethyl, propyl, butyl, hexyl, heptyl, octyl, nonyl, dodecyl, tetradecyl, hexadecyl, octadecyl, etc.

The poly(diphenylether-p-xylenes) can be prepared by first reacting diphenylether with α,α'-dichloro-p-xylene in the presence of a Friedel-Crafts catalyst to form a copolymer as represented by the following equation:

(II)

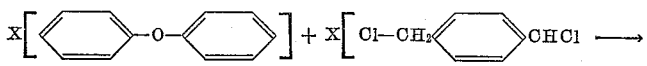

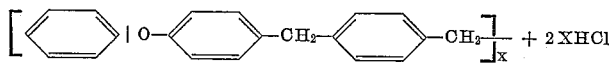

wherein X is the same as described hereinabove.

Prior to the reaction with α,α'-dichloro-p-xylene, the diphenylether may be alkylated. This alkylated diphenylether may be represented by the following formula:

(III) 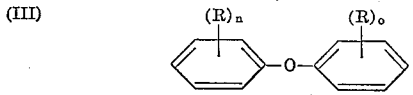

wherein R, n, and o are the same as defined hereinabove, and n+o has a value equal to at least 1.

In certain instances, it may be desirable to alkylate the poly(diphenylether-p-xylylene) to form the compound:

(IV) 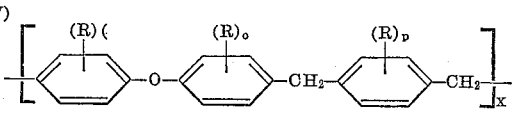

wherein R, n, o, and p are the same as defined hereinabove, and n+o+p has a value of at least 1.

The polymeric materials described herein can be prepared by bulk or solution Friedel-Crafts polymerization reactions. The Friedel-Crafts catalysts which can be used include ferric chloride, aluminum chloride, aluminum bromide, etc. Such catalysts are used in amounts of about 0.01% to about 1.0% by weight. The mol ratio of diphenylether to α,α'-dichloro-p-xylene can be in the range of 10:1 to 1:1, preferably from 1.2:1.

Alkylation catalysts include aluminum chloride, hydrofluoric acid, etc.

A diphenylether will react with α,α'-dichloro-p-xylene at temperatures ranging from 65° C. to 150° C. For best results in this reaction, it is preferred to use temperatures ranging from 90° C. to 120° C.

The various solvents which can be used in the polymerization reactions include chloroform, o-dichlorobenzene, nitrobenzene, etc.

The molecular weight of the resulting polymeric compounds ranges from about 10,000 to about 50,000. That is, the molecular weight of the alkylated diphenylether-p-xylylene copolymers are in the range of about 10,000 to about 50,000.

The new compositions of this invention can be prepared by reacting a diphenylether (or an alkylated diphenylether) with α,α'-dichloro-p-xylene, using as a catalyst, from 0.01% to 1.0%, by weight, of anhydrous aluminum chloride, based on the total weight of diphenylether and α,α-dichloro-p-xylene, at temperatures from 65° C. to 150° C. for a period of time from 0.5 hours to 30 hours.

The resulting reaction mixtures can be dissolved in benzene, followed by filtration. An acetone-methanol blend (2 parts by volume of methanol per volume of acetone) is added to the benzene solution to precipitate the polymer. The polymers are redissolved in benzene and reprecipitated with an acetone-methanol blend. The resulting products can be dried in a vacuum oven at temperatures of about 100° C. The resulting polymeric compound can then be alkylated with a hydrocarbon containing from 2 to 20 carbon atoms, using hydrofluoric acid as a catalyst.

Example I hereinbelow illustrates the preparation of a new compound of this invention.

*Example I.—Alkylated Poly(Diphenylether-p-Xylylene)*

A mixture of 15 grams (0.086 mol) of $\alpha,\alpha'$-dichloro-p-xylene, 18 grams (0.106 mol) diphenylether, 0.01 grams of ferric oxide, and 0.05 grams ferric chloride was heated on a steam plate at 100° C. to 105° C. for less than 0.5 hour. The resulting polymer was dissolved in benzene and the benzene solution was filtered. An acetone-methanol blend (2 volumes methanol per volume acetone) was added to precipitate the polymer, which was recovered and dried. A 10% solution of this polymer in toluene had a viscosity of 1.81 cs. at 100° F.

A mixture of 10 grams of the above diphenylether-p-xylylene copolymer and 59 grams of a polypropylene (i.e., a proplyene tetramer) in a mol ratio of polypropylene to benzene ring of 3:1, was dissolved in 225 grams of o-dichlorobenzene. This mixture was reacted in the presence of 150 cc. of hydrofluoric acid as a catalyst for a period of 4 hours at 5° C. The reaction mixture was poured into cold dilute caustic solution. The reaction product was separated and water washed, and washed with dilute sodium bicarbonate, then dissolved in benzene. The benzene solution was blended with an acetone-methanol blend to precipitate the product. The product was a tacky, benzene soluble polymeric compound. The viscosity of a 10% solution of this polymer in toluene was 2.55 cs.

Table I hereinbelow presents data to show the effectiveness of the polymeric compound of Example I hereinabove as a Viscosity Index improving agent in lubricating oil compositions. The alkylated copolymer was blended into (A) a $C_{14-16}$ alkyl diphenylether, and (B) a California solvent refined naphthenic base oil having a viscosity of 150 SSU at 100° F.

TABLE I

| Base Oil | Percent Alkylated Copolymer | Viscosities (cs.) | | |
|---|---|---|---|---|
| | | 100° F. | 210° F. | V.I. |
| (A) | 0 | 26.8 | 4.83 | 114 |
| | 5 | 50.7 | 8.37 | 136 |
| | 10 | 96.6 | 14.5 | 137 |
| | 15 | 171.0 | 23.1 | 134 |
| (B) | 0 | 150 | 4.8 | 90 |
| | 5 | 46.3 | 7.29 | 124 |
| | 10 | 74.5 | 11.1 | 133 |

*Example II.—Alkylated Poly(Diphenyl Ether-p-Xylylene)*

A mixture of 35 grams of a poly(diphenyl ether-p-xylylene) (wherein the mol ratio of diphenyl ether to $\alpha,\alpha'$-dichloro-p-xylene in the initial reaction had a value of 1.2), 200 grams of a propylene tetramer (the same as used in Example I hereinabove) (the mol ratio of the tetramer to benzene rings of the copolymer being 3:1), 300 cc. of o-dichlorobenzene and 300 cc. of hydrofluoric acid were charged to a reaction vessel at 5° C. The components of the above mixture were agitated for a period of 4 hours at 5° C., after which the reaction product was obtained in a manner similar to that outlined hereinabove in Example I.

A 10% solution of the recovered polymer in toluene had a viscosity (cs.) at 100° F. of 8.58.

Table II hereinbelow presents data showing the effectiveness of these polymers of Example II as V.I. improving agents in lubricating oils. The base oil was a $C_{14-16}$ alkyl diphenyl ether.

TABLE II

| Percent Alkylated Copolymer | Viscosities (cs.) | | |
|---|---|---|---|
| | 100° F. | 210° F. | V.I. |
| 0 | 26.8 | 4.83 | 114 |
| 5 | 83.1 | 14.4 | 145 |
| 10 | 221.0 | 35.3 | 138 |
| 15 | 526.0 | 74.3 | 131 |

*Example III.—Preparation of Poly(Alkylated Bis(p-Phenoxyphenyl) Ether-p-Xylylene)*

A mixture of 35 grams of bis(p-phenoxyphenyl) ether-p-xylylene copolymer, 200 grams of a propylene tetramer (the mol ratio of tetramer to benzene ring being from 3:1), 315 grams of o-dichlorobenzene and 200 cc. of hydrofluoric acid agitated at 5° C. for a period of 2 hours. 100 cc. of hydrofluoric acid was added to the above blend, after which the mixture was agitated for an additional 4 hours at 5° C. The reaction product was recovered in a manner described hereinabove in Example I.

A 10% solution of the recovered polymer in toluene had a viscosity of 1.92 cs. at 100° F.

Table III hereinbelow presents data obtained to show the effectiveness of the alkylated copolymers of Example III as V.I. improving agents. The base oil was a $C_{14-16}$ alkyl diphenyl ether.

TABLE III

| Percent Alkylated Copolymer | Viscosities (cs.) | | |
|---|---|---|---|
| | 100° F. | 210° F. | V.I. |
| 0 | 26.8 | 4.83 | 114 |
| 5 | 42.3 | 7.28 | 134 |
| 10 | 66.6 | 10.7 | 138 |
| 15 | 107.0 | 16.0 | 137 |

*Example IV.—Poly(Alkylated Diphenylether-p-Xylylene)*

A mixture of 70 grams (0.4 mol) of $\alpha,\alpha'$-dichloro-p-xylene, 168 grams (0.44 mol) of $C_{14-16}$ sec-alkyl diphenyl ether, 20 cc. chloroform, 0.01 grams ferric oxide, and 0.05 ferric chloride was heated at 100 to 105° C. for a period of about 1.3 hours. During the course of the reaction, 100 cc. of o-dichlorobenzene was added slowly to keep the reaction mixture fluid.

The mixture was refluxed with 150 cc. xylene in the presence of 0.05 grams aluminum chloride for 1.5 hours, after which the mixture was filtered. The polymeric compound was dissolved in benzene, to which was added a methanol-acetone blend to precipitate the product which was dried in vacuo.

A 10% solution of this polymer in toluene had a viscosity of 3.7 cs. at 100° F.

Table IV hereinbelow presents data obtained to show the effectiveness of the polymers of Example IV as V.I. improving agents. Base oil (A) was a $C_{14-16}$ alkyldiphenylether. Base oil (B) was a California petroleum base oil.

TABLE IV

| Base Oil | Percent Polymer | Viscosities (cs.) | | |
|---|---|---|---|---|
| | | 100° F. | 210° F. | V.I. |
| (A) | 0 | 26.8 | 4.83 | 114 |
| | 5 | 57.6 | 9.93 | 143 |
| | 10 | 118.0 | 19.1 | 142 |
| | 15 | 232 | 35.1 | 137 |
| (B) | 0 | | | 90 |
| | 5 | 52.7 | 8.5 | 135 |
| | 10 | 92.3 | 14.9 | 141 |
| | 15 | 166.0 | 25.3 | 139 |

Table V hereinbelow presents further data concerning the effectiveness of the polymeric compounds described herein as V.I. improving agents. Base oils (A) and (B) were the same as described hereinabove.

TABLE V

| Alkylated Polymer Used | Viscosity of 10% Sol. in Toluene | Percent Alkylated Polymer | Base Oil | Viscosities (cs.) | | |
|---|---|---|---|---|---|---|
| | | | | 100° F. | 210° F. | V.I. |
| (1) | 1.76 | 5 | (A) | 42.7 | 7.25 | 134 |
| | | 10 | (A) | 67.9 | 11.0 | 139 |
| | | 15 | (A) | 107.0 | 16.3 | 138 |
| (2) | 3.45 | 5 | (A) | 57.1 | 9.89 | 143 |
| | | 10 | (A) | 115.0 | 19.0 | 143 |
| | | 15 | (A) | 219 | 34.6 | 138 |
| | | 5 | (B) | 56.9 | 9.04 | 134 |
| | | 10 | (B) | 105.0 | 16.3 | 139 |
| | | 15 | (B) | 95.0 | 28.6 | 137 |
| (3) | | 5 | (A) | 64.5 | 11.0 | 143 |
| (4) | 1.29 | 5 | (A) | 36.8 | 6.27 | 128 |
| | | 10 | (A) | 50.9 | 8.17 | 132 |
| | | 15 | (A) | 71.0 | 10.7 | 133 |
| | | 5 | (B) | 40.4 | 6.26 | 113 |
| | | 10 | (B) | 52.1 | 7.72 | 120 |
| | | 15 | (B) | 72.5 | 10.1 | 124 |
| (5) | 2.56 | 5 | (A) | 50.1 | 8.62 | 140 |
| | | 10 | (A) | 92.1 | 15.3 | 143 |
| | | 15 | (A) | 168.0 | 26.5 | 140 |
| | | 5 | (B) | 56.1 | 8.54 | 128 |
| | | 10 | (B) | 103.0 | 15.0 | 135 |
| | | 15 | (B) | 187.0 | 26.2 | 136 |

NOTES:
(1) Poly(n-nonyl, sec-dodecyldiphenylether-p-xylylene).
(2) Poly[di(C₁₆–C₁₈, sec alkyl) diphenylether-p-xylylene], wherein the mol ratio of $C_{16}$ to $C_{18}$ was 32:68.
(3) Poly(n-nonyl diphenylether-p-xylylene).
(4) Poly[di(n-nonyl) diphenylether-p-xylylene].
(5) Poly(dodecyldiphenylether-p-xylylene) wherein there were at least 3 dodecyl radicals per benzene ring.

As stated hereinabove, the new V.I. improving agents described herein are of greater thermal stability than prior V.I. improving agents. In order to determine the thermal stability thereof, the new compounds were incorporated in a base oil consisting of an alkyl diphenyl ether, wherein the alkyl group was derived from monoolefins having an average of 14 to 16 carbon atoms. The resulting solution was heated at the temperatures noted and the period of time designated, after which the viscosities were determined.

TABLE VI

| V.I. Improving Agent | Concentration (Wt. percent) | Test Temp., ° F. | Test Time, Hours | Viscosity Before Test | | Viscosity After Test | | | |
|---|---|---|---|---|---|---|---|---|---|
| | | | | 100° F. | 210° F. | 100° F. | Percent Change | 210° F. | Percent Change |
| (1) | 4.2 | 500 | 66 | 69.6 | 11.8 | 56.3 | −19.2 | 9.44 | −20.3 |
| | | 600 | 6 | 69.6 | 11.8 | 48.2 | 30.7 | 7.95 | −32.8 |

(1) Alkylated (C₁₂) diphenyl ether-p-xylylene copolymer.

As V.I. improving agents, the new products described herein can be used in amounts of 1% to 20%, by weight, in a wide variety of oils, including mineral oils, such as naphthenic base, paraffin base, and mixed base oils derived from petroleum; synthetic oils, such as polymers of alkylene oxides; aromatic-type oils, such as alkylphenyl diethers, alkylbiphenyls, alkylbiphenyl ethers, polyalkyl terephenyls, polyphenyls, polyarylalkanes, dialkylbenzenes, aryl esters, etc.

I claim:
1. A polymeric compound having a molecular weight in the range of 10,000 to about 50,000 obtained by reacting a diphenyl ether with an $\alpha,\alpha'$-dichloro-p-xylene in the presence of a Friedel-Crafts catalyst at temperatures in the range of 90° C. to 120° C., wherein the mol ratio of said diphenyl ether to said xylene is from 10:1 to 1:1 and removing the HCl obtained by said reaction.

2. A Friedel-Crafts catalyzed resinous condensation product obtained by reacting a diphenyl ether with an $\alpha,\alpha'$-dichloro-p-xylene, at temperatures in the range of 90° C. to 120° C., and removing the HCl obtained by said reaction, wherein the mol ratio of said diphenyl ether to said xylene is from 10:1 to 1:1, wherein said polymer has a molecular weight of about 10,000 to about 50,000.

3. A resinous condensation product having a molecular weight in the range of 10,000 to 50,000 obtained by reacting an alkyl diphenyl ether with an $\alpha,\alpha'$-dichloro-p-xylene in the presence of a Friedel-Crafts catalyst at temperatures in the range of 90° C. to 120° C., and removing the resulting HCl, wherein the mol ratio of said diphenyl ether to said xylene is from 10:1 to 1:1, and wherein said diphenyl ether contains from 1 to 3 alkyl radicals on each phenyl ring.

4. A resinous condensation product having a molecular weight in the range of 10,000 to 50,000 obtained by reacting an alkyl diphenyl ether with an $\alpha,\alpha'$-dichloro-p-xylene in the presence of a Friedel-Crafts catalyst at temperatures in the range of 90° C. to 120° C., and removing the resulting HCl, wherein the mol ratio of said diphenyl ether to said xylene is from 10:1 to 1:1, and wherein each phenyl ring of said diphenyl ether contains an alkyl radical having from 2 to 20 carbon atoms.

References Cited in the file of this patent

UNITED STATES PATENTS

| | | |
|---|---|---|
| 2,060,715 | Arvin | Nov. 10, 1936 |
| 2,079,279 | Coleman et al. | May 4, 1937 |
| 2,287,901 | Pier et al. | June 30, 1942 |
| 2,326,702 | Taylor et al. | Aug. 10, 1943 |
| 2,330,722 | Lieber | Sept. 28, 1943 |
| 2,542,111 | Bloch | Feb. 20, 1951 |
| 2,911,380 | Doedens | Nov. 3, 1959 |

UNITED STATES PATENT OFFICE

CERTIFICATE OF CORRECTION

Patent No. 3,054,773  September 18, 1962

Donovan R. Wilgus

It is hereby certified that error appears in the above numbered patent requiring correction and that the said Letters Patent should read as corrected below.

Columns 1 and 2, lines 11 to 17, equation (II), after "CHCl" and before the arrow insert a closing bracket; same equatipn (II), after the fourth benzene ring, strike out the vertical line and insert a horizontal line; same column 2, lines 32 to 35, equation (IV), above the first benzene ring, for "(R)(" read -- $(R)_n$ --.

Signed and sealed this 19th day of February 1963.

(SEAL)
Attest:

ESTON G. JOHNSON
Attesting Officer

DAVID L. LADD
Commissioner of Patents